Patented July 8, 1947

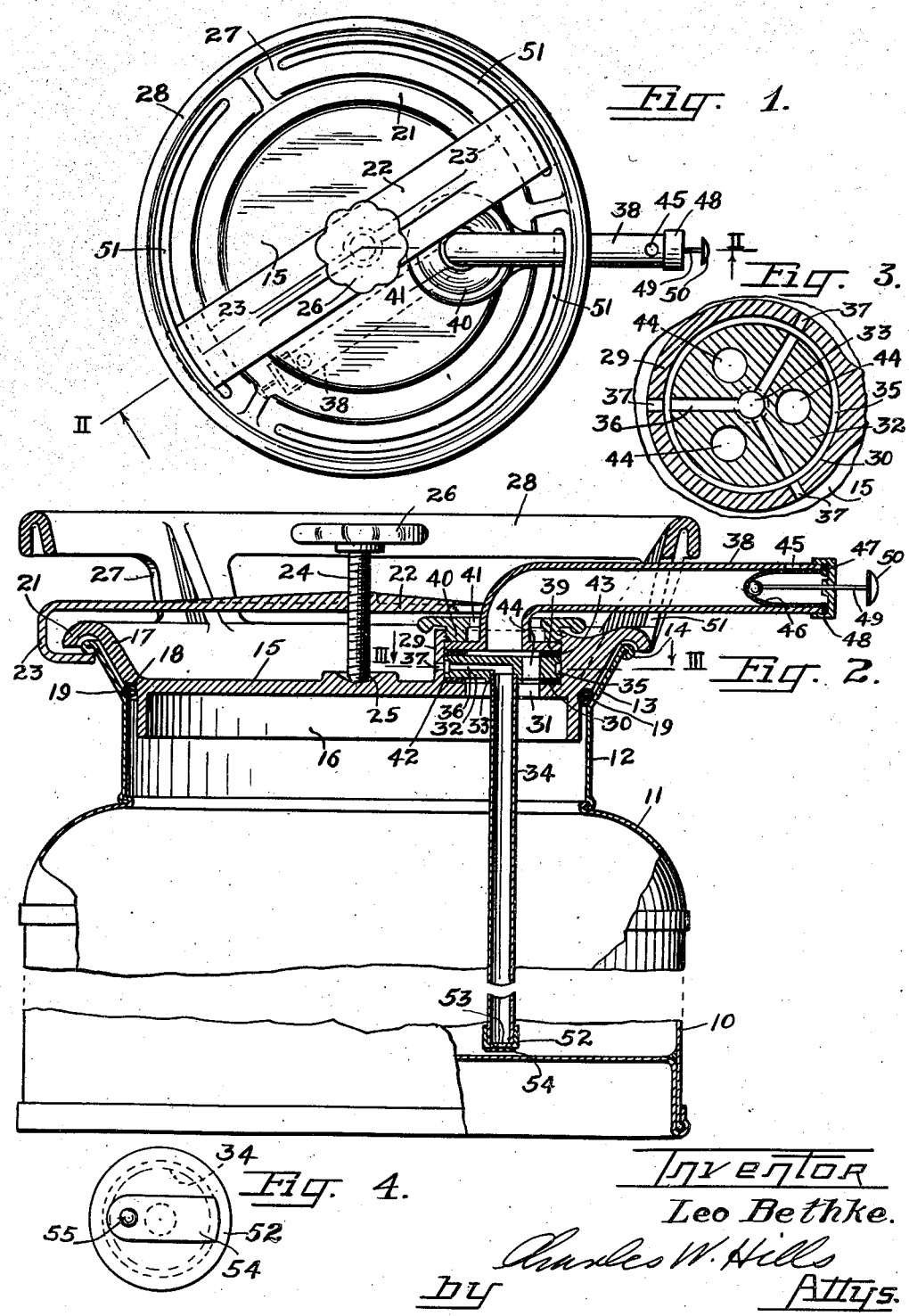
July 8, 1947.     L. BETHKE     2,423,679
DEVICE FOR DISPENSING FROM AN INVERTED MILK CAN
Filed April 6, 1944
Inventor
Leo Bethke.

2,423,679

UNITED STATES PATENT OFFICE 2,423,679

DEVICE FOR DISPENSING FROM AN INVERTED MILK CAN

Leo Bethke, Maywood, Ill., assignor to Solar-Sturges Mfg. Co., Melrose Park, Ill., a corporation of Illinois Application April 6, 1944, Serial No. 529,721

7 Claims. (Cl. 222—185)

My invention relates to milk cans and particularly to the dispensing of milk therefrom. In restaurants, at soda fountains, or other places of business, where milk is to be used or dispensed, the milk is usually delivered in wholesale quantities in large metal cans and a usual procedure has been, in the dispensing of the milk, to remove the can cover and ladle the milk out of the can. This is a very unsanitary procedure as the milk will be exposed to the air, and microbes, dust or other foreign matter. The general object of my invention is therefore to provide a milk can with dispensing means so that milk may be dispensed directly from the can without removal of the cover therefrom and without exposure of the milk in the can.

More in detail an important object of the invention is to provide a cover for the can having a dispensing spout structure thereon through which milk may be dispensed from the can in desired quantities.

Another object is to provide a cover structure which will also function as a base to support the can in inverted position and with dispensing spout structure thereon through which the milk may be dispensed while the can is in inverted position.

A further object is to provide dispensing structure on the can cover whose spout extends radially outwardly for dispensing of milk when the can is in its inverted position, but which may be swung to be within the cover structure to be protected during shipment of the can.

A further object is to provide improved means for venting air into the can to compensate for the milk dispensed therefrom.

Still a further object is to provide a dispensing cover structure which is interchangeable with a standard cover structure in order that, when milk is delivered to a customer in a can with the regular cover structure, this cover structure may be removed and the dispensing cover structure applied when the can is to be set up for dispensing of the milk therefrom through the dispensing spout.

Other objects and features will become apparent from the following specification in connection with the accompanying drawings, in which drawings:

Figure 1 is a plan view of the dispensing cover structure;

Figure 2 is an enlarged section on plane II—II of the dispensing cover showing it applied to a can whose contents are to be dispensed;

Figure 3 is an enlarged section on plane III—III Figure 2; and

Figure 4 is an enlarged view of the inner end of the air vent tube which forms part of the dispenser structure.

The can shown is of a well known type comprising a cylindrical body 10 on which is secured the breast 11 having the neck 12 seamed thereto and which terminates in the flared end 13 whose edge portion is curled down to provide the annular bead 14. The can cover shown comprises the body 15 of disk form from whose periphery extend inner and outer flanges 16 and 17, the outer flange being flared to conform to the flared end 13 of the can neck. The annular recess 18 at the juncture of the flanges receives a sealing gasket 19 which engages the flange end of the neck so that the cover structure will have seal fit in the neck. The outer portion of the flange 17 is deflected outwardly and downwardly to form the annular protecting head 21 which overhangs the neck bead 14 to provide protection for the end of the neck.

For clamping the cover in its closing position, a clamping bar 22 extends across the top thereof and terminates in hook ends 23 which extend around the domed head 21 of the flange 17 for engagement against the underside of the bead 14. A clamping screw 24 threads through the clamping bar at the center thereof for engagement in the seating cavity 25 formed on the cover body 15, the outer end of the screw having a knurled head 26 secured thereto for turning thereof. To lock the cover in closed position, the clamping band is extended in diametral direction across the cover with the end of the screw engaging in the cavity 25 and then upon turning of the screw by its head 26 the bar will be raised with its ends into engagement with the lower side of the bead 14 and the cover will be forced downwardly for compression of the sealing gasket 19 and sealing engagement of the cover with the can. I have provided a dispenser structure on the cover for dispensing of the can contents when the can is inverted. To provide an adequate supporting base for the can when in inverted position, legs 27 are extended from the cover flange 17 for supporting the base ring or rail 28 which may be of U-shaped cross-section, as shown. At one side of the cover body 15 a boss 29 extends upwardly and has the cylindrical chamber 30 therein which communicates with the interior of the can through the passageway 31. Seated in the bottom of the chamber 30 is a cylindrical plate or disk 32 which has the passageway 33 extending thereinto centrally thereof and upwardly from the bottom, this passageway being threaded to receive the outer end of the tube 34 extending down to the bottom of the can. The disk has the circumferentially extending channel 35 in its outer side connected with the passageway 33 by passages 36 extending radially in the disk. The boss 29 has holes 37 communicating with the channel 35 to connect this channel with the exterior for flow of air upwardly through the tube 34 and into the can when the can is in its inverted dispensing position.

A laterally extending tubular dispensing spout 38 has its inner end turned downwardly to extend into the chamber 30 where it terminates in a flange 39. A plug 40 has threaded engagement in the outer end of the boss 29 and has the opening 41 for receiving the flanged end of the spout. Between the disk 32 and the bottom of the chamber 30 a sealing washer 42 is interposed, and between the spout flange 39 and the disk 32 a sealing washer 43 is interposed. Now when the plug 40 is screwed down against the spout flange, the disk 32 will be clamped in place and the spout will be clamped to the cover by swivel connection. Extending axially through the disk 32 inwardly of the washers 42 and 43 are a number of passages 44 through which the contents of the can may flow into the spout when the can is in its inverted dispensing position. Outflow from the spout is controlled by a suitable cock or valve. As shown, the spout has the outlet opening 45 in its side adjacent its end and this outlet opening is controlled by a thimble-shaped plug 46 of elastic material such as rubber. This plug is inserted in the end of the spout with the flange 47 at its outer end clamped to the spout end by a threaded cap 48. A stem 49 extends through the cap and into the plug with its inner end secured to the bottom of the plug, the outer end of the stem having a button 50 thereon for manipulation of the plug. The plug extends past the spout outlet 45 and in its normal distended position will close the outlet. However, when the button and the stem are shifted inwardly, the plug will elongate and will contract radially away from the outlet for exposure thereof for outflow from the spout when the can is in its inverted or dispensing position. Upon release of the button 50, the elasticity of the plug will cause it to distend back into normal position for closure of the spout outlet 45.

The spout 38 is in alinement with one of the spaces 51 between the legs 27 which support the base rail 28. When the can is to be shipped or transported, the spout, by virtue of its swivel connection with the cover, may be swung around through the space 51 into its inner or idle position above the cover body 15 and alongside of the clamping bar 22, as indicated by the dotted lines on Figure 1. The spout structure will thus be amply protected. When the contents are to be dispensed from the can, the spout structure is swung outwardly along the space 51 into service position as shown on Figure 2 and the full lines on Figure 1, and the can is then inverted to be supported on the base rail 28 on the cover structure. The spout outlet 45 will then be on the lower side of the spout for reception of the can contents in suitable containers when the plug button 50 is pushed in.

The can is never fully filled at the dairy, so that after the can is inverted for dispensing therefrom, the inner end of the air tube 34 will be exposed to air above the milk or other contents. As shown on Figures 2 and 4, a cap 52 is applied to the inner end of the air tube and has the opening 53 therethrough. Extending across the outer side of the cap across the opening 53 is a flap valve 54 secured at one end to the cap as by a rivet 55. This flap valve may be a thin plate of spring metal so that its tendency will be to close the opening 53 when the can is in upright position in order to prevent access of air to the can contents. However, when the can is inverted and the contents are being dispensed therefrom, the vacuum effect above the contents will cause opening of the valve for inflow of air through the air inlet openings or vents 37 and the air tube 34 into the can above the contents for equalization of the air pressure, but as soon as the pressure is equalized the valve 54 will again close the opening 53. Thus, the contents of the can can be dispensed in a most sanitary manner.

The base ring 28 on the cover structure, besides functioning to support the can in its inverted or dispensing position, will function to protect the spout structure when in its retracted position and will also function as a handle for carrying the can. The can cover with the legs and the base ring supported thereby may be an integral structure, such as a casting. The dispenser cover is preferably constructed to be interchangeable with the ordinary can cover so that, if a customer receives a can with the ordinary cover thereon, and he desires to dispense from the can, he will remove the ordinary cover and apply the dispenser cover. Then when a can has been emptied and is to be sent back for refill, the dispenser cover is removed and the ordinary cover reapplied to the can.

I have shown a practical and efficient embodiment of my invention but I do not desire to be limited to the exact construction, arrangement or operation shown and described as changes and modifications may readily be made without departing from the scope of the invention.

I claim as my invention:

1. Dispenser structure for a milk can comprising a cover therefor and means for clamping the cover in sealing engagement with the can, a chamber formed in said cover, a dispensing spout extending laterally from said cover and terminating at its inner end in a flange in said chamber, said chamber having a passageway in its bottom in communication with the interior of the can, a disk in said chamber below said spout flange and having passageway therethrough connecting said chamber inlet passageway with said spout, said spout receiving milk from said can when said can is in inverted position, a structure on said cover for supporting said can in inverted position, an air inlet tube extending from said disk and passageways in said disk connecting said tube with said chamber, said chamber having an inlet for air from the exterior of the can, whereby air may flow into the space above the milk level in the can when the can is inverted and milk is dispensed therefrom through said spout, and a plug engaging in the outer end of said chamber for clamping said spout flange and disk axially in said chamber.

2. Dispenser structure for a milk can comprising a cover therefor and means for clamping the cover in sealing engagement with the can, a chamber formed in said cover, a dispensing spout extending laterally from said cover and terminating at its inner end in a flange in said chamber, said chamber having a passageway in its bottom in communication with the interior of the can, a disk in said chamber below said spout flange and having passageway therethrough connecting said chamber inlet passageway with said spout, said spout receiving milk from said can when said can is in inverted position, a structure on said cover for supporting said can in inverted position, an air inlet tube extending from said disk and passageways in said disk connecting said tube with said chamber, said chamber having an inlet for air from the exterior of the can, whereby air may flow into the space above the milk level in the can when the can is inverted and milk is dispensed therefrom through said spout, and a plug engaging in the outer end of said chamber for clamping said spout flange and disk axially in said chamber, said plug permitting swing of said spout from its dispensing position into protected position over said cover.

3. A removable dispenser cover to be substituted for the regular cover of a milk can when the contents of the can are to be dispensed, means for removably clamping said removable cover to the can, said dispensing cover being of dish shape with its lower portion fitting into the mouth of the can to form a closure therefor and its outer portion forming a base for supporting the can when in inverted dispensing position, the bottom of said removable cover having a discharge passageway therethrough, a discharge spout communicating at its inner end with said discharge passageway and having swivel connection with the removable cover, the side of said removable cover above its lower portion having a circumferentially extending passageway through which said spout may be swung outwardly into dispensing position or may be swung back to be entirely within the confines of said cover, and venting means for venting air into the inverted can during dispensing of the contents therefrom.

4. A dispenser cover for milk cans to be substituted for the regular cover when the contents of the can are to be dispensed, said dispenser cover comprising a dished body portion for engaging the neck of the can for closure thereof, arms extending up from the rim of said body part and a base portion secured to the outer end of said arms on which said can may be supported when in inverted position for dispensing, a locking bar extending across the top of said body portion and below said base portion for interlocking engagement with the neck of the can to hold the cover closed, the bottom of said cover having a discharge passageway, a discharge spout communicating at its inner end with said discharge passageway and having swivel connection with the cover, said spout having a discharge end bent at an angle to its connection to said cover whereby said spout may be swung outwardly in a horizontal plane through one of the spaces between said arms for lateral extension from the cover in dispensing position or to be swung back through said space to be in protected position entirely within the confines of the cover, and means for venting air into the can during the dispensing operation when the can is in inverted position.

5. A dispenser for a milk can comprising a dish shaped body portion for engaging the neck of a can for closure thereof, arms extending upwardly from the rim of the body portion and a supporting base ring secured to the outer ends of said arms on which the can is supported when in inverted position for dispensing of the contents therefrom, a clamping bar extending across the top of said body portion and through spaces between said arms for interlocking engagement with the can neck to clamp the cover in closed position, the portions of said base ring between said arms forming grips whereby the can with the cover thereon may be lifted, the bottom of said cover having a discharge passageway therethrough, a discharge spout communicating at its inner end with said discharge passageway and having swivel connection with the cover whereby the outer portion of said spout may be swung out through the passageway between adjacent arms into dispensing position or to be swung back through said space to be entirely within the confines of the cover.

6. A dispenser structure for a milk can comprising a cover therefor to be substituted for the regular cover when the contents of the can are to be dispensed, a cylindrical chamber formed in said cover communicating at its bottom with the interior of the can, an L-shaped dispensing spout terminating at its inner end in a flange for engaging in said chamber for communication of the spout with the interior of the can, a disk between the bottom of the chamber and said flange apertured for the passage of milk therethrough to said spout, said disk serving as a bearing for said flange, an annular plug in the outer end of said chamber holding said flange therein for swing of the outer end of the spout in a horizontal plane into dispensing position when the can is inverted or back into protected position within the confines of the cover.

7. A milk can cover of dish shape whose lower portion fits into the milk can for a closure thereof and the margin of its flaring side wall constituting a base for the can when inverted, the flaring side wall of said cover between the lower portion thereof and said sidewall margin having circumferentially spaced openings through it through which fingers may be inserted for lifting or carrying the can when the cover is thereto clamped and the can is erect, a clamp bar across said cover projecting through two of said openings and having hook ends for engaging with the can neck bead, and a screw threaded through said bar and engaging said cover to draw the said hook ends of the bar tightly against the neck bead to clamp the cover to the can.

LEO BETHKE.

REFERENCES CITED

The following references are of record in the file of this patent:

UNITED STATES PATENTS

| Number | Name | Date |
|---|---|---|
| 1,260,333 | Cordley | Mar. 26, 1918 |
| 1,740,384 | Wright | Dec. 17, 1929 |
| 1,734,474 | Creech | Nov. 5, 1929 |
| 104,602 | Knoche | June 21, 1870 |
| 1,977,292 | Segal | Oct. 16, 1934 |
| 1,622,163 | Niederhauser | Mar. 22, 1927 |
| 554,250 | Ebling | Feb. 11, 1896 |
| 2,369,721 | Delzer | Feb. 20, 1945 |
| 290,068 | Lane | Dec. 11, 1883 |
| 1,998,000 | Doering | Apr. 16, 1935 |
| 2,017,133 | Rice | Oct. 15, 1935 |
| 195,898 | Lester | Oct. 9, 1877 |